United States Patent

Lin

(10) Patent No.: US 9,459,141 B2
(45) Date of Patent: Oct. 4, 2016

(54) BRIGHTNESS CONTROL APPARATUS AND BRIGHTNESS CONTROL METHOD

(71) Applicant: GETAC TECHNOLOGY CORPORATION, Hsinchu County (TW)

(72) Inventor: Chia-Huang Lin, New Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 144 days.

(21) Appl. No.: 14/205,280

(22) Filed: Mar. 11, 2014

(65) Prior Publication Data

US 2015/0262548 A1 Sep. 17, 2015

(51) Int. Cl.
- *G09G 5/02* (2006.01)
- *G01J 1/42* (2006.01)
- *G01K 13/00* (2006.01)
- *G09G 5/10* (2006.01)
- *G06F 3/14* (2006.01)

(52) U.S. Cl.
CPC .............. *G01J 1/42* (2013.01); *G01K 13/00* (2013.01); *G09G 5/10* (2013.01); *G06F 3/14* (2013.01); *G09G 2320/041* (2013.01); *G09G 2320/0626* (2013.01); *G09G 2330/02* (2013.01); *G09G 2330/045* (2013.01); *G09G 2360/144* (2013.01)

(58) Field of Classification Search
None
See application file for complete search history.

(56) References Cited

U.S. PATENT DOCUMENTS

| | | | | |
|---|---|---|---|---|
| 6,172,611 B1 * | 1/2001 | Hussain | ................... | G06F 1/206 340/584 |
| 7,183,727 B2 * | 2/2007 | Ferguson | ........... | H05B 41/3922 315/149 |
| 8,176,308 B2 * | 5/2012 | Chiu | ......... | G06F 1/26 713/2 |
| 2003/0169226 A1 * | 9/2003 | Yamada | ............. | H05B 33/0818 345/102 |
| 2004/0061708 A1 * | 4/2004 | Oh | ....................... | G09G 3/3611 345/690 |
| 2004/0178974 A1 | 9/2004 | Miller et al. | | |
| 2004/0233125 A1 * | 11/2004 | Tanghe | ................. | G06F 3/1446 345/1.3 |
| 2005/0041008 A1 * | 2/2005 | Lee | ....................... | G09G 3/3406 345/102 |
| 2006/0017404 A1 * | 1/2006 | Jang | ....................... | G09G 3/3406 315/291 |
| 2006/0155517 A1 * | 7/2006 | Dobbs | ................. | G06F 11/3058 702/188 |
| 2006/0256067 A1 * | 11/2006 | Montero | .............. | G09G 3/3406 345/102 |
| 2006/0274023 A1 * | 12/2006 | Sultenfuss | ........... | G09G 3/3406 345/102 |
| 2007/0085785 A1 * | 4/2007 | Ozaki | .................. | G09G 3/2025 345/77 |
| 2007/0090962 A1 * | 4/2007 | Price | ........................ | G08B 5/36 340/691.1 |
| 2007/0091057 A1 * | 4/2007 | Lee | ...................... | G09G 3/3413 345/102 |
| 2007/0182378 A1 * | 8/2007 | Tsuji | .................. | G01R 31/3606 320/132 |
| 2008/0192140 A1 * | 8/2008 | Lee | ........................... | G06F 3/14 348/362 |
| 2009/0058887 A1 * | 3/2009 | Lin | .......................... | G06F 3/14 345/690 |
| 2009/0289965 A1 | 11/2009 | Kurokawa et al. | | |
| 2011/0234651 A1 * | 9/2011 | Chen | ........................ | G09G 5/10 345/690 |
| 2012/0297224 A1 * | 11/2012 | Chen | ...................... | G06F 1/3265 713/322 |
| 2013/0061081 A1 * | 3/2013 | Lee | ......................... | G06F 1/206 713/324 |
| 2013/0120480 A1 | 5/2013 | Takada et al. | | |
| 2013/0215093 A1 | 8/2013 | Bergquist et al. | | |
| 2014/0240377 A1 * | 8/2014 | Matsui | ................. | G09G 3/3406 345/690 |

* cited by examiner

*Primary Examiner* — Barry Drennan
*Assistant Examiner* — Jason Pringle-Parker

(57) ABSTRACT

A brightness control apparatus and a brightness control method are provided. A basic input/output system unit determines to let a chip or an embedded controller to control the brightness of a display according to an environmental condition or an adjustment operation of a user.

18 Claims, 3 Drawing Sheets

BRIGHTNESS CONTROL APPARATUS AND BRIGHTNESS CONTROL METHOD

BACKGROUND OF THE INVENTION

1. Field of the Invention

The invention relates to a control apparatus and particularly relates to a brightness control apparatus and a brightness control method.

2. Description of Related Art

Computers may be categorized into rugged computers and general computers, and the difference is that rugged computers are often used in harsh environments, such as high-temperature or low-temperature environments. Therefore, rugged computers are required to have much higher adaptability to the environmental temperature than the general computers. Factors, such as compactness and light weight, which may be important to general computers, are not the main concerns for rugged computers.

When a rugged computer is operated in a harsh environment, such as at high temperature or low temperature, the brightness of the display may need to be controlled from time to time in order to maintain normal operations of the rugged computer. For example, the brightness of the display needs to be reduced at a high temperature so as to prevent the problem of black screen. For powering on at a low temperature, the brightness of the display needs to be reduced to prevent excessive power consumption (because low-temperature power-on procedure takes more time and the power of other elements needs to be adjusted for heating). In a situation of heavy load, the brightness of the display also needs to be reduced to lower power consumption.

Before the window operating system Windows 8 appears, the brightness of the display is controlled by a pulse width modulation signal outputted by an embedded controller, so as to achieve the aforementioned function of brightness adjustment. However, under the configuration of Windows 8, the brightness of the display is controlled by the Windows Display Driver Model (WDDM). In other words, the brightness of the display is controlled by the pulse width modulation signal outputted by the Platform Controller Hub (PCH) under control of a driver of the Windows Display Driver Model (WDDM). For this reason, the brightness of the display cannot be adjusted by the traditional way in conditions of high temperature, low temperature, or heavy load to maintain normal operation of the computer.

SUMMARY OF THE INVENTION

The invention provides a brightness control apparatus and a brightness control method for adjusting a display to a special brightness, so as to meet an adjustment demand of the user or ensure a normal operation of an electronic device.

A brightness control method of the invention is adapted for a display of an electronic device and includes the following steps. An environmental condition of the electronic device is detected. Whether the environmental condition of the electronic device matches a preset condition is determined. The electronic device enters a special brightness adjustment mode if the environmental condition matches the preset condition. The brightness of the display is controlled by an embedded controller in the special brightness adjustment mode.

In an embodiment of the invention, the preset condition includes that an environmental temperature is higher than a first preset temperature or lower than a second preset temperature, wherein the first preset temperature is higher than the second preset temperature. The determining step further includes: determining whether the environmental temperature is higher than the first preset temperature or lower than the second preset temperature, and the environmental condition matches the preset condition if the environmental temperature is higher than the first preset temperature or lower than the second preset temperature. The step of entering the special brightness adjustment mode further includes that: the embedded controller adjusts the brightness of the display to be lower than a preset low brightness.

In an embodiment of the invention, the preset condition includes that an environmental light intensity is higher than a preset light intensity. The determining step further includes: determining whether the environmental light intensity is higher than the preset light intensity, and the environmental condition matches the preset condition if the environmental light intensity is higher than the preset light intensity. The step of entering the special brightness adjustment mode further includes that: the embedded controller adjusts the brightness of the display to be higher than a preset high brightness.

In an embodiment of the invention, the following steps are executed if the environmental condition does not match the preset condition. Whether a special brightness adjustment event occurs is detected. The electronic device enters the special brightness adjustment mode if the special brightness adjustment event occurs. The electronic device enters a general mode if the special brightness adjustment event does not occur, wherein the brightness of the display is controlled by a chip in the general mode.

In an embodiment of the invention, the step of detecting whether the special brightness adjustment event occurs includes: detecting whether a special brightness adjustment command is received to adjust the brightness of the display to be higher than a first threshold brightness or lower than a second threshold brightness, wherein the first threshold brightness is greater than the second threshold brightness.

In an embodiment of the invention, the step of detecting the environmental condition of the electronic device is to detect the environmental condition of the electronic device in a period of a power-on self test.

A brightness control method of the invention is adapted for a display of an electronic device and includes: detecting an environmental condition of the electronic device. Whether the environmental condition of the electronic device matches a preset condition is determined. If the environmental condition does not match the preset condition, the following steps are executed: detecting whether a special brightness adjustment event occurs. The electronic device enters a special brightness adjustment mode if the special brightness adjustment event occurs, wherein the brightness of the display is controlled by an embedded controller in the special brightness adjustment mode.

In an embodiment of the invention, the brightness control method further includes: causing the electronic device to enter a general mode if the special brightness adjustment event does not occur, wherein the brightness of the display is controlled by a chip in the general mode.

In an embodiment of the invention, the preset condition includes that an environmental temperature is higher than a first preset temperature or lower than a second preset temperature, wherein the first preset temperature is higher than the second preset temperature. The determining step further includes: determining whether the environmental temperature is higher than the first preset temperature or lower than the second preset temperature, and the environmental condition matches the preset condition if the environmental temperature is higher than the first preset temperature or lower than the second preset temperature.

In an embodiment of the invention, the preset condition includes that an environmental light intensity is higher than a preset light intensity. The determining step further includes: determining whether the environmental light intensity is higher than the preset light intensity, and the environmental condition matches the preset condition if the environmental light intensity is higher than the preset light intensity.

In an embodiment of the invention, the step of detecting whether the special brightness adjustment event occurs includes: detecting whether a special brightness adjustment command is received to adjust the brightness of the display to be higher than a first threshold brightness or lower than a second threshold brightness, wherein the first threshold brightness is greater than the second threshold brightness.

In an embodiment of the invention, the step of detecting the environmental condition of the electronic device is to detect the environmental condition of the electronic device in a period of a power-on self test.

A brightness control apparatus of the invention is adapted for controlling a brightness of a display of an electronic device, and the brightness control apparatus includes an environmental condition detecting unit, an embedded controller, a switch unit, and a basic input/output system unit. The environmental condition detecting unit is configured to detect an environmental condition of the electronic device. The embedded controller is coupled to the environmental condition detecting unit and configured to determine whether the environmental condition of the electronic device matches a preset condition. The switch unit is coupled to the embedded controller and the display. The basic input/output system unit is coupled to the embedded controller and the switch unit and configured to control the switch unit to electrically connect the display to the embedded controller to cause the electronic device to enter a special brightness adjustment mode if the environmental condition matches the preset condition, wherein the brightness of the display is controlled by the embedded controller in the special brightness adjustment mode.

In an embodiment of the invention, the environmental condition includes at least one of an environmental temperature and an environmental light intensity.

In an embodiment of the invention, the preset condition includes that the environmental temperature is higher than a first preset temperature or lower than a second preset temperature, wherein the first preset temperature is higher than the second preset temperature; wherein the embedded controller further determines whether the environmental temperature is higher than the first preset temperature or lower than the second preset temperature, and the environmental condition matches the preset condition if the environmental temperature is higher than the first preset temperature or lower than the second preset temperature; and wherein the embedded controller further notifies the basic input/output system unit to cause the electronic device to enter the special brightness adjustment mode when the environmental condition matches the preset condition, and the embedded controller adjusts the brightness of the display to be lower than a preset low brightness after the electronic device enters the special brightness adjustment mode.

In an embodiment of the invention, the preset condition includes that the environmental light intensity is higher than a preset light intensity. The embedded controller further determines whether the environmental light intensity is higher than the preset light intensity, and the environmental condition matches the preset condition if the environmental light intensity is higher than the preset light intensity. The embedded controller further notifies the basic input/output system unit to cause the electronic device to enter the special brightness adjustment mode when the environmental condition matches the preset condition, and the embedded controller adjusts the brightness of the display to be higher than a preset high brightness after the electronic device enters the special brightness adjustment mode.

In an embodiment of the invention, the brightness control apparatus further includes a chip and an adjustment detecting unit. The chip is coupled to the switch unit. The adjustment detecting unit is coupled to the basic input/output system unit and configured to detect whether a special brightness adjustment event occurs, wherein in a situation that the environmental condition does not match the preset condition, if the special brightness adjustment event occurs, the basic input/output system unit controls the switch unit to electrically connect the display to the embedded controller to cause the electronic device to enter the special brightness adjustment mode. If the special brightness adjustment event does not occur, the basic input/output system unit controls the switch unit to electrically connect the display to the chip to cause the electronic device to enter a general mode, wherein the brightness of the display is controlled by the chip in the general mode.

In an embodiment of the invention, the adjustment detecting unit further detects whether a special brightness adjustment command is received to adjust the brightness of the display to be higher than a first threshold brightness or lower than a second threshold brightness, so as to determine whether the special brightness adjustment event occurs, wherein the first threshold brightness is greater than the second threshold brightness.

In an embodiment of the invention, the environmental condition detecting unit further detects the environmental condition in a period of a power-on self test, and the embedded controller further determines whether the environmental condition matches the preset condition in the period of the power-on self text, wherein the embedded controller notifies the basic input/output system unit to cause the electronic device to enter the special brightness adjustment mode if the environmental condition matches the preset condition.

Based on the above, the invention determines whether to use the chip or the embedded controller to control the brightness of the display through the basic input/output system unit according to the environmental condition or the adjustment made by the user, so as to meet the demand of the user or ensure normal operation of the electronic device.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
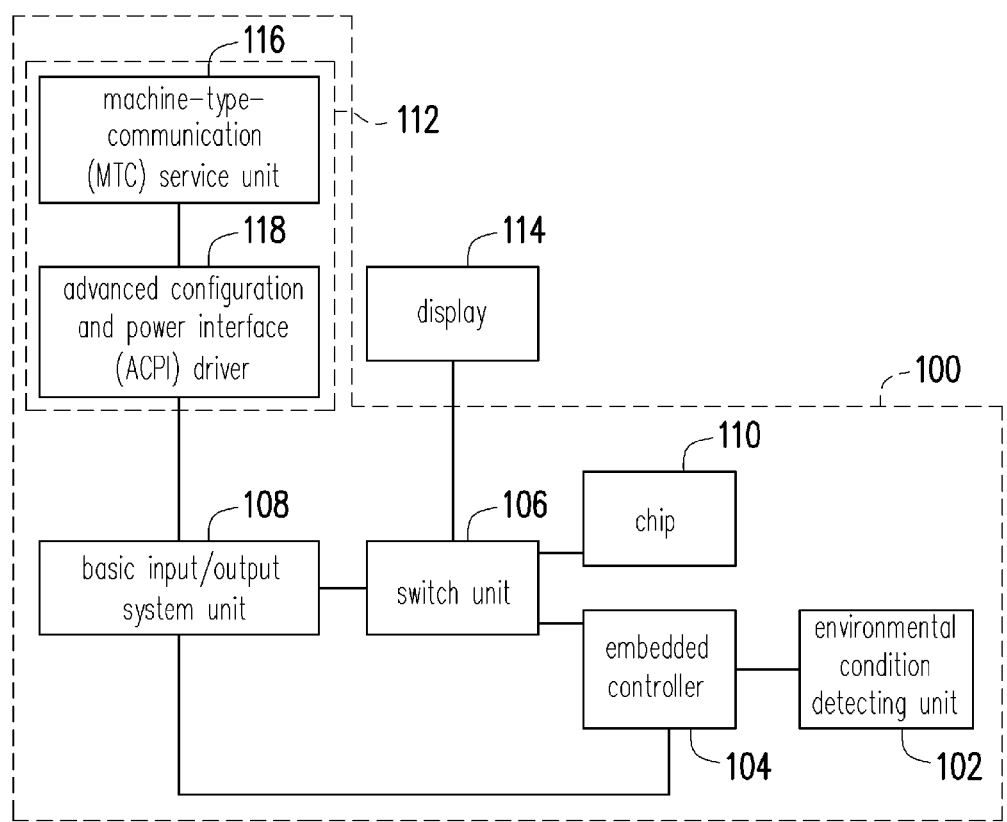
FIG. 1 is a schematic diagram of a brightness control apparatus according to an embodiment of the invention.

FIG. 1 is a schematic diagram of a brightness control apparatus according to an embodiment of the invention. With reference to FIG. 1, a brightness control apparatus 100 includes an environmental condition detecting unit 102, an embedded controller 104, a switch unit 106, a basic input/output system unit 108, a chip 110, and an adjustment detecting unit 112. The brightness control apparatus 100 is configured to control a brightness of a display 114 of an electronic device. The electronic device may be a notebook computer, a desktop computer, or the like, for example. The chip 110 may be a south bridge chip, for example. The adjustment detecting unit 112 is coupled to the basic input/output system unit 108. The basic input/output system unit 108 is coupled to the switch unit 106 and the embedded controller 104. The switch unit 106 is coupled to the embedded controller 104, the chip 110, and the display 114. The embedded controller 104 is coupled to the environmental condition detecting unit 102.

The environmental condition detecting unit 102 is configured for detecting an environmental condition of the electronic device. The embedded controller 104 is capable of determining whether the environmental condition of the electronic device matches a preset condition, wherein the environmental condition may include at least one of an environmental temperature and an environmental light intensity. The basic input/output system unit 108 controls the switch unit 106 to electrically connect the display 114 to the embedded controller 104 or the chip 110 according to a determination result of the embedded controller 104, wherein, when the display 114 is electrically connected to the chip 110 through the switch unit 106, the electronic device is in a general mode, and the brightness of the display 114 is controlled by the chip 110. When the display 114 is electrically connected to the embedded controller 104 through the switch unit 106 (that is, the brightness of the display 114 is controlled by the embedded controller 104), the electronic device is in a special brightness adjustment mode. Unlike the chip 110, the embedded controller 104 is not restricted by Windows 8 operating system. Therefore, the adjustment range of the brightness of the display 114 in the special brightness adjustment mode is larger than an adjustment range in the general mode.

To be more specific, the aforementioned preset condition may include that the environmental temperature is higher than a first preset temperature or lower than a second preset temperature, wherein the first preset temperature is higher than the second preset temperature. The embedded controller 104 determines whether the environmental temperature is higher than the first preset temperature or lower than the second preset temperature based on the environmental condition outputted by the environmental condition detecting unit 102. If the environmental temperature is higher than the first preset temperature or lower than the second preset temperature, namely, the environmental temperature is too high or too low and exceeds a normal temperature range, the embedded controller 104 determines that the environmental condition matches the preset condition. Meanwhile, the embedded controller 104 notifies the basic input/output system unit 108 to cause the electronic device to enter the special brightness adjustment mode, such that the brightness of the display 114 is under control of the embedded controller 104, and then the embedded controller 104 adjusts the brightness of the display 114 to be lower than a preset low brightness, so as to achieve the purpose of over-temperature protection or low-temperature use.

It should be noted that, in order to ensure that the electronic device operates properly in an extreme environmental temperature condition, the environmental condition detecting unit 102 may detect the environmental condition during a period of power-on self test. If the environmental temperature is higher than the first preset temperature or lower than the second preset temperature, the embedded controller 104 determines that the environmental condition matches the preset condition and notifies the basic input/output system unit 108 to cause the electronic device to enter the special brightness adjustment mode directly. Consequently, the electronic device enters the special brightness adjustment mode without going through the aforementioned over-temperature protection mechanism after the power-on is finished.

In addition, the embedded controller 104 also determines whether the environmental light intensity is higher than a preset light intensity. If the environmental light intensity is higher than the preset light intensity and causes that the user is not able to see the content shown by the display clearly, the embedded controller 104 determines that the environmental condition matches the preset condition. Meanwhile, the embedded controller 104 also notifies the basic input/output system unit 108 to cause the electronic device to enter the special brightness adjustment mode. When the electronic device enters the special brightness adjustment mode, the embedded controller 104 adjusts the brightness of the display 114 to be higher than a preset high brightness, so as to overcome the problem that the environmental light intensity affects the user's viewing of the content shown by the display.

In addition to automatically adjusting the electronic device to the special brightness adjustment mode according to the environmental condition, the brightness control apparatus 100 may also cause the electronic device to enter the special brightness adjustment mode according to an operation of the user. As shown in FIG. 1, the adjustment detecting unit 112 in the brightness control apparatus 100 may include a machine-type-communication (MTC) service unit 116 and an advanced configuration and power interface (ACPI) driver 118, wherein the machine-type-communication service unit 116 is configured to determine whether a brightness adjustment command is received. If the brightness adjustment command is received, the advanced configuration and power interface driver 118 is controlled to drive the basic input/output system unit 108. In a situation that the environmental condition does not match the preset condition, the adjustment detecting unit 112 may detect whether a special brightness adjustment event occurs. If the special brightness adjustment event occurs, the basic input/output system unit 108 may also control the switch unit 106 to electrically connect the display 114 to the embedded controller 104, so as to cause the electronic device to enter the special brightness adjustment mode. The special brightness adjustment event may be triggered, for example, when the user adjusts the brightness of the display 114 to be higher than a first threshold brightness or lower than a second threshold brightness, wherein the first threshold brightness is greater than the second threshold brightness. The first threshold brightness and the second threshold brightness may respectively represent a maximum brightness and a minimum brightness that the chip 110 may control the display 114 to display, and they are brightness limits of the display 114 under the configuration of Windows 8 operating system. When the user adjusts the brightness of the display 114 to be lower than the first threshold brightness or higher than the second threshold brightness (namely, adjusts the brightness of the display 114 back to a brightness range under control of the chip 110), the basic input/output system unit 108 again controls the switch unit 106 to electrically connect the display 114 to the chip 110, so as to turn the electronic device back to the general mode.

Here, in this embodiment, the brightness of the display 114 is adjusted to be higher than the first threshold brightness or lower than the second threshold brightness in a progressive manner. The user may use a physical or virtual brightness adjustment button of the electronic device to progressively adjust the brightness of the display 114 from the brightness range controllable by the chip 110 to outside the brightness range controllable by the chip 110, so as to cause the electronic device to enter the special brightness adjustment mode. That is, the adjustment detecting unit 112 is capable of detecting whether a special brightness adjustment command is received, wherein the special brightness adjustment command instructs to directly adjust the brightness of the display 114 to be higher than the first threshold brightness or lower than the second threshold brightness. If the adjustment detecting unit 112 receives the special brightness adjustment command, it determines that the special brightness adjustment event occurs and notifies the basic input/output system unit 108 to control the switch unit 106 to electrically connect the display 114 to the embedded controller 104, so as to cause the electronic device to enter the special brightness adjustment mode directly and adjust the brightness of the display 114 to be higher than the first threshold brightness or lower than the second threshold brightness.

It should be noted that the preset high brightness and the preset low brightness may be brightness limits that the display 114 presents under restriction of the configuration of Windows 8 operating system, which are the first threshold brightness and the second threshold brightness. However, the invention is not limited thereto. The preset high brightness and the preset low brightness may respectively be a brightness value higher than the first threshold brightness and a brightness value lower than the second threshold brightness.

In some embodiments, a physical or virtual hotkey of the electronic device may be used to cause the electronic device to enter the special brightness adjustment mode directly. When the user touches the physical or virtual hotkey, the embedded controller 104 controls the switch unit 106 through the basic input/output system unit 108 to electrically connect the display 114 to the embedded controller 104, so as to enter the special brightness adjustment mode, thereby enabling the embedded controller 104 to directly control the brightness of the display 114.

The brightness control mechanism of the invention may simultaneously support display architectures of different operating systems. In some embodiments, if the electronic device uses Windows 8 as the operating system, control of the brightness of the display 114 is switched to the chip 110 or the embedded controller 104 through the switch unit 106; however, if the electronic device uses Windows 7 as the operating system, the brightness of the display 114 is controlled by the embedded controller 104.

Figure 2:
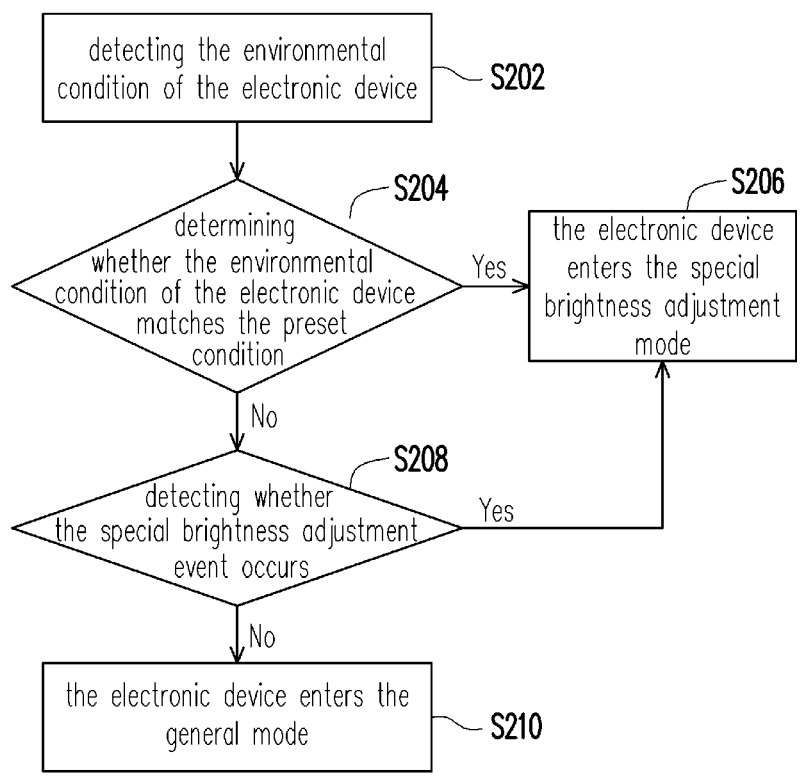
FIG. 2 is a schematic diagram showing a brightness control method according to an embodiment of the invention.

FIG. 2 is a schematic diagram showing a brightness control method according to an embodiment of the invention. In view of the above, referring to FIG. 2, a brightness control method of the aforementioned brightness control apparatus includes the following steps. First, an environmental condition of the electronic device is detected (Step S202), wherein the environmental condition may include at least one of an environmental temperature and an environmental light intensity. Next, whether the environmental condition of the electronic device matches a preset condition is determined (Step S204), wherein the preset condition may be that the environmental temperature is higher than a first preset temperature or lower than a second preset temperature, for example. When the environmental temperature is higher than the first preset temperature or lower than the second preset temperature, it is determined that the environmental condition matches the preset condition. Or, the preset condition may be that the environmental light intensity is higher than a preset light intensity, for example. If the environmental light intensity is higher than the preset light intensity, it is determined that the environmental condition matches the preset condition.

If the environmental condition of the electronic device matches the preset condition, the electronic device enters a special brightness adjustment mode (Step S206), wherein in the special brightness adjustment mode, the brightness of the display of the electronic device is controlled by an embedded controller. Thus, the brightness presented by the display 114 is not restricted by the configuration of Windows 8 operating system. Furthermore, in the special brightness adjustment mode, in a situation that the environmental temperature is higher than the first preset temperature or lower than the second preset temperature, the embedded controller adjusts the brightness of the display to be lower than a preset low brightness so as to achieve over-temperature protection. On the other hand, in a situation that the environmental light intensity is higher than the preset light intensity, the embedded controller adjusts the brightness of the display to be higher than a preset high brightness, so as to overcome the problem that the environmental light intensity affects the user's viewing of the content shown by the display.

It should be noted that the step of detecting the environmental condition of the electronic device (Step S202) may also be executed in a period of a power-on self test for the electronic device to enter the special brightness adjustment mode directly. Consequently, the electronic device enters the special brightness adjustment mode without going through the aforementioned over-temperature protection mechanism after the power-on is finished, thereby ensuring that the electronic device operates properly at an extreme temperature.

In contrast, if the environmental condition of the electronic device does not match the preset condition, whether a special brightness adjustment event occurs is detected (Step S208). For example, whether a special brightness adjustment command is received is detected, wherein the special brightness adjustment command instructs to adjust the brightness of the display to be higher than a first threshold brightness or lower than a second threshold brightness. If the special brightness adjustment event occurs, Step S206 is performed to cause the electronic device to enter the special brightness adjustment mode. If the special brightness adjustment event does not occur, the electronic device enters a general mode (Step S210), wherein in the general mode, the brightness of the display is controlled by a chip. That is, the brightness of the display is restricted by the configuration of Windows 8 operating system.

Figure 3:
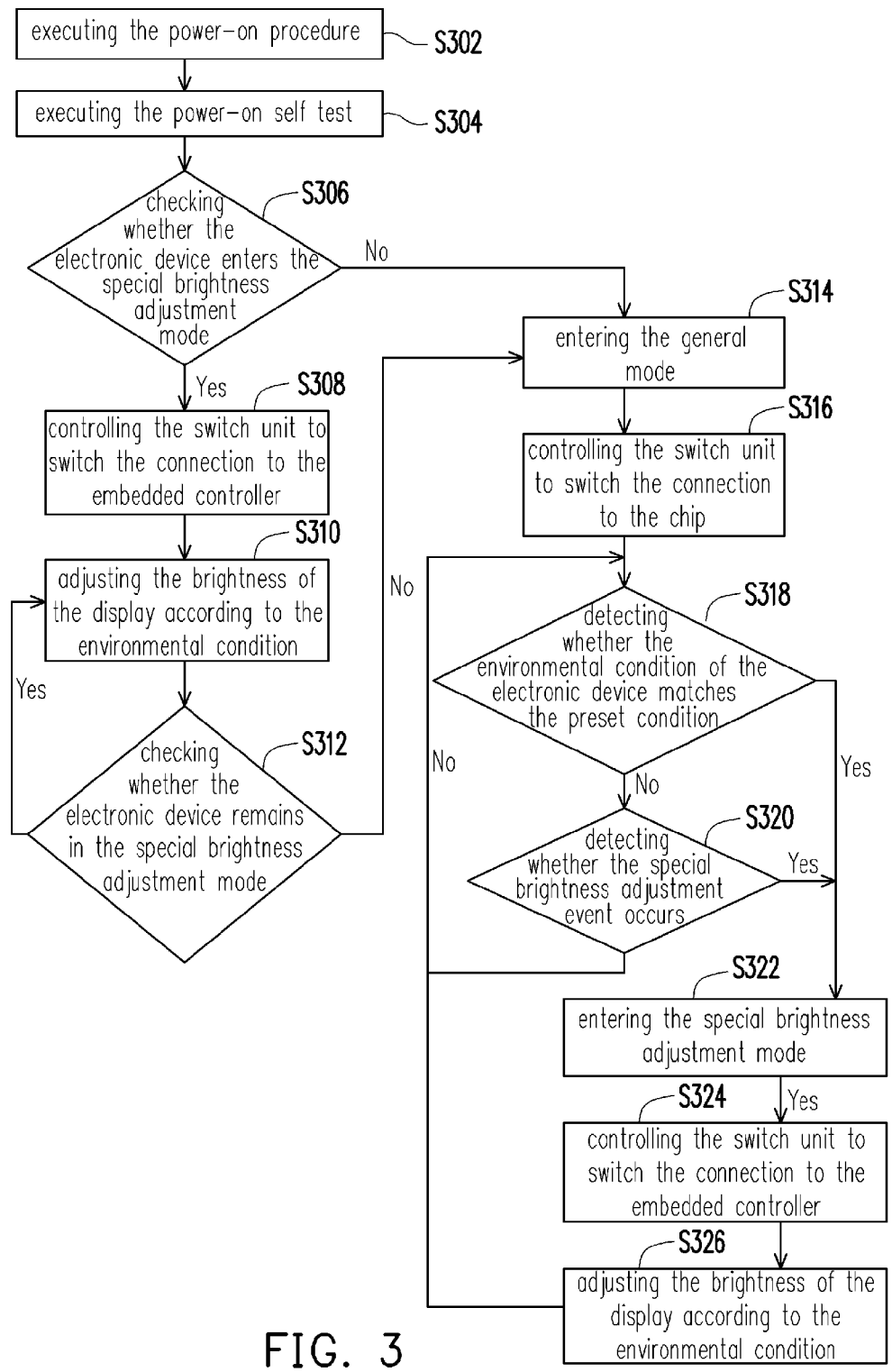
FIG. 3 is a schematic diagram showing a brightness control method according to another embodiment of the invention.

FIG. 3 is a schematic diagram showing a brightness control method according to another embodiment of the invention. With reference to FIG. 3, the brightness control method of this embodiment includes the following steps. First, a power-on procedure is executed (Step S302). Next, a power-on self test (POST) is executed (Step S304). Then, whether the electronic device enters a special brightness adjustment mode is checked (Step S306), which is for example to check whether an environmental condition of the electronic device matches a preset condition. If the electronic device is to enter the special brightness adjustment mode (e.g. the electronic device enters the special brightness adjustment mode when the environmental condition of the electronic device matches the preset condition), the switch unit is controlled to switch the connection to the embedded controller (Step S308). In contrast, if the electronic device does not enter the special brightness adjustment mode and enters the general mode (Step S314), the switch unit is controlled to switch the connection to the chip (Step S316) for the display to display a preset brightness. In the general mode, the brightness of the display is restricted by the configuration of Windows 8 operating system.

In the situation that the switch unit switches the connection to the embedded controller, the embedded controller then adjusts the brightness of the display according to the environmental condition (Step S310). Thereafter, whether the electronic device remains in the special brightness adjustment mode is checked (Step S312). If the electronic device remains in the special brightness adjustment mode (e.g. the electronic device remains in the special brightness adjustment mode when the environmental condition of the electronic device matches the preset condition), the method returns to Step S310 to continue adjusting the brightness of the display according to the environmental condition. If the electronic device is not in the special brightness adjustment mode (e.g. the environmental condition of the electronic device does not match the preset condition), Step S314 is performed to cause the electronic device to enter the general mode, and then Step S316 is performed to control the switch unit to switch the connection to the chip, such that the brightness of the display is restricted by the configuration of Windows 8 operating system. After entering the general mode, the embedded controller may continue detecting whether the environmental condition of the electronic device matches the preset condition (Step S318). If the environmental condition of the electronic device does not match the preset condition, whether a special brightness adjustment event occurs is detected (Step S320). If no special brightness adjustment event occurs, the method goes back to Step S318 to continue detecting whether the environmental condition of the electronic device matches the preset condition. If the special brightness adjustment event occurs or if the environmental condition of the electronic device is determined as matching the preset condition in Step S318, the electronic device enters the special brightness adjustment mode (Step S322) and then the switch unit is controlled to switch the connection to the embedded controller (Step S324) for the embedded controller to adjust the brightness of the display according to the environmental condition (Step S326). In addition, after the embedded controller adjusts the brightness of the display according to the environmental condition, the method may go back to Step S318 to continue detecting whether the environmental condition of the electronic device matches the preset condition.

To sum up, the invention determines whether to use the chip or the embedded controller to control the brightness of the display through the basic input/output system unit according to the environmental condition or the adjustment made by the user, so as to meet the demand of the user or ensure normal operation of the electronic device. Moreover, because the brightness of the display can be controlled by the chip, the brightness of the display conforms to the test of Windows Hardware Certification Kit (WHCK). According to the invention, control of the electronic device over the brightness of the display is more flexible, and one brightness control apparatus can simultaneously support multiple operating systems.

Although the invention has been disclosed by the above embodiments, they are not intended to limit the invention. It will be apparent to those of ordinary skill in the art that modifications and variations to the invention may be made without departing from the spirit and the scope of the invention. Accordingly, the protection scope of the invention falls in the appended claims.

What is claimed is:

1. A brightness control method, adapted for a display of an electronic device, the electronic device comprising a chip and an embedded controller, the brightness control method comprising:
    detecting an environmental condition of the electronic device;
    determining whether the environmental condition of the electronic device matches a preset condition;
    causing the electronic device to enter a special brightness adjustment mode when the environmental condition matches the preset condition, and causing the electronic device to enter a general mode when the environmental condition does not match the preset condition; and
    executing the following steps when the environmental condition does not match the preset condition:
        detecting whether a special brightness adjustment event occurs;
        causing the electronic device to enter the special brightness adjustment mode if the special brightness adjustment event occurs; and
        causing the electronic device to enter the general mode if the special brightness adjustment event does not occur, wherein the step of detecting whether the special brightness adjustment event occurs comprises detecting whether a special brightness adjustment command is received to adjust the brightness of the display to be higher than a first threshold brightness or lower than a second threshold brightness, wherein the first threshold brightness is greater than the second threshold brightness;
    wherein a brightness of the display is controlled by the embedded controller independently of the chip in the special brightness adjustment mode, and the brightness of the display is controlled by the chip independently of the embedded controller in the general mode.

2. The brightness control method according to claim 1, wherein the environmental condition comprises at least one of an environmental temperature and an environmental light intensity.

3. The brightness control method according to claim 2, wherein the preset condition comprises that the environmental temperature is higher than a first preset temperature or lower than a second preset temperature, wherein the first preset temperature is higher than the second preset temperature;

wherein the determining step further comprises: determining whether the environmental temperature is higher than the first preset temperature or lower than the second preset temperature, and the environmental condition matches the preset condition if the environmental temperature is higher than the first preset temperature or lower than the second preset temperature; and wherein the step of entering the special brightness adjustment mode further comprises that: the embedded controller adjusts the brightness of the display to be lower than a preset low brightness.

4. The brightness control method according to claim 2, wherein the preset condition comprises that the environmental light intensity is higher than a preset light intensity;

wherein the determining step further comprises: determining whether the environmental light intensity is higher than the preset light intensity, and the environmental condition matches the preset condition if the environmental light intensity is higher than the preset light intensity; and wherein the step of entering the special brightness adjustment mode further comprises that: the embedded controller adjusts the brightness of the display to be higher than a preset high brightness.

5. The brightness control method according to claim 1, wherein the step of detecting the environmental condition of the electronic device comprises detecting the environmental condition of the electronic device in a period of a power-on self test.

6. The brightness control method according to claim 1, wherein the chip controls the brightness according an operating system of the device, and the embedded controller controls the brightness independently of the operating system.

7. A brightness control method, adapted for a display of an electronic device, the electronic device comprising a chip and an embedded controller, the brightness control method comprising:

detecting an environmental condition of the electronic device;

determining whether the environmental condition of the electronic device matches a preset condition; and executing the following steps if the environmental condition does not match the preset condition:

detecting whether a special brightness adjustment event occurs, wherein the step of detecting whether the special brightness adjustment event occurs comprises detecting whether a special brightness adjustment command is received to adjust the brightness of the display to be higher than a first threshold brightness or lower than a second threshold brightness, wherein the first threshold brightness is greater than the second threshold brightness; and causing the electronic device to enter a special brightness adjustment mode when the special brightness adjustment event occurs, and causing the electronic device to enter a general mode when the special brightness adjustment event does not occur;

wherein the brightness of the display is controlled by the embedded controller independently of the chip in the special brightness adjustment mode, and the brightness of the display is controlled by the chip independently of the embedded controller in the general mode.

8. The brightness control method according to claim 7, wherein the environmental condition comprises at least one of an environmental temperature and an environmental light intensity.

9. The brightness control method according to claim 7, wherein the preset condition comprises that the environmental temperature is higher than a first preset temperature or lower than a second preset temperature, wherein the first preset temperature is higher than the second preset temperature; and wherein the determining step further comprises: determining whether the environmental temperature is higher than the first preset temperature or lower than the second preset temperature, and the environmental condition matches the preset condition if the environmental temperature is higher than the first preset temperature or lower than the second preset temperature.

10. The brightness control method according to claim 7, wherein the preset condition comprises that the environmental light intensity is higher than a preset light intensity;

wherein the determining step further comprises: determining whether the environmental light intensity is higher than the preset light intensity, and the environmental condition matches the preset condition if the environmental light intensity is higher than the preset light intensity.

11. The brightness control method according to claim 7, wherein the step of detecting the environmental condition of the electronic device comprises detecting the environmental condition of the electronic device in a period of a power-on self test.

12. The brightness control method according to claim 7, wherein the chip controls the brightness according an operating system of the device, and the embedded controller controls the brightness independently of the operating system.

13. A brightness control apparatus, adapted for controlling a brightness of a display of an electronic device, the brightness control apparatus comprising:

an environmental condition detecting unit detecting an environmental condition of the electronic device;

an embedded controller coupled to the environmental condition detecting unit and determining whether the environmental condition of the electronic device matches a preset condition;

a chip;

a switch unit coupled to the embedded controller, the chip and the display; and a basic input/output system unit coupled to the embedded controller and the switch unit and controlling the switch unit to electrically connect the display to the embedded controller to cause the electronic device to enter a special brightness adjustment mode when the environmental condition matches the preset condition; and an adjustment detecting unit coupled to the basic input/output system unit and detecting whether a special brightness adjustment event occurs, under a situation that the environmental condition does not match the preset condition, wherein:

when the special brightness adjustment event occurs, the basic input/output system unit controls the switch unit to electrically connect the display to the embedded controller to cause the electronic device to enter the special brightness adjustment mode; and when the special brightness adjustment event does not occur, the basic input/output system unit controls the switch unit to electrically connect the display to the chip to cause the electronic device to enter a general mode;

wherein the adjustment detecting unit further detects whether a special brightness adjustment command is received to adjust the brightness of the display to be higher than a first threshold brightness or lower than a second threshold brightness, so as to determine whether the special brightness adjustment event occurs, wherein the first threshold brightness is greater than the second threshold brightness; and wherein the brightness of the display is controlled by the embedded controller independently of the chip in the special brightness adjustment mode, and the embedded controller controls the display to electrically connect to the chip to cause the electronic device to enter the general mode, wherein the brightness of the display is controlled by the chip independently of the embedded controller in the general mode.

14. The brightness control apparatus according to claim 13, wherein the environmental condition comprises at least one of an environmental temperature and an environmental light intensity.

15. The brightness control apparatus according to claim 14, wherein the preset condition comprises that the environmental temperature is higher than a first preset temperature or lower than a second preset temperature, wherein the first preset temperature is higher than the second preset temperature;

wherein the embedded controller further determines whether the environmental temperature is higher than the first preset temperature or lower than the second preset temperature, and the environmental condition matches the preset condition if the environmental temperature is higher than the first preset temperature or lower than the second preset temperature; and wherein the embedded controller further notifies the basic input/output system unit to cause the electronic device to enter the special brightness adjustment mode when the environmental condition matches the preset condition, and the embedded controller adjusts the brightness of the display to be lower than a preset low brightness after the electronic device enters the special brightness adjustment mode.

16. The brightness control apparatus according to claim 14, wherein the preset condition comprises that the environmental light intensity is higher than a preset light intensity;

wherein the embedded controller further determines whether the environmental light intensity is higher than the preset light intensity, and the environmental condition matches the preset condition if the environmental light intensity is higher than the preset light intensity; and wherein the embedded controller further notifies the basic input/output system unit to cause the electronic device to enter the special brightness adjustment mode when the environmental condition matches the preset condition, and the embedded controller adjusts the brightness of the display to be higher than a preset high brightness after the electronic device enters the special brightness adjustment mode.

17. The brightness control apparatus according to claim 13, wherein the environmental condition detecting unit further detects the environmental condition in a period of a power-on self test, and the embedded controller further determines whether the environmental condition matches the preset condition in the period of the power-on self text, wherein the embedded controller notifies the basic input/output system unit to cause the electronic device to enter the special brightness adjustment mode if the environmental condition matches the preset condition.

18. The brightness control apparatus according to claim 13, wherein the chip controls the brightness according an operating system of the device, and the embedded controller controls the brightness independently of the operating system.

* * * * *